United States Patent [19]

Sague

[11] Patent Number: 5,104,239

[45] Date of Patent: Apr. 14, 1992

[54] IN SITU REPLACEABLE BEARING

[76] Inventor: John E. Sague, 702 Princeton Ave., Philadelphia, Pa. 19111

[21] Appl. No.: 665,362

[22] Filed: Mar. 6, 1991

[51] Int. Cl.⁵ .................................. F16C 25/06
[52] U.S. Cl. ................................. 384/448; 384/619; 384/620; 384/622; 384/624; 384/560; 29/898.01; 29/898.041; 29/898.062
[58] Field of Search .............. 384/448, 619, 620, 622, 384/624, 560, 559; 29/898.01, 898.041, 898.062

[56] References Cited

U.S. PATENT DOCUMENTS

| | | |
|---|---|---|
| 2,430,359 | 6/1944 | Messinger . |
| 3,361,501 | 6/1964 | Messinger et al. . |
| 3,814,488 | 11/1974 | Rood . |
| 4,606,654 | 8/1986 | Yatsu et al. .................. 384/447 |
| 4,906,113 | 3/1990 | Sague ........................... 384/618 |
| 4,961,653 | 10/1990 | Suzuki et al. ................. 384/622 |
| 4,973,173 | 11/1990 | Bergling ....................... 384/620 |

Primary Examiner—Lenard A. Footland
Attorney, Agent, or Firm—Woodcock Washburn Kurtz Mackiewicz & Norris

[57] ABSTRACT

A bearing and a method for extending the life of such bearing is disclosed. The bearing is shown to include an inner ring having first and second race channels, wherein each race channel defines first and second raceways adapted for contact with loaded rolling elements. An outer ring is shown to have third and fourth race channels, wherein each race channel defines first and second raceways adapted for contact with loaded rolling elements. A plurality of rolling elements are positioned within the race channels and are preferably oriented so that the axis of rotation of rolling elements in the first race channel is uniform and the axis of rotation of rolling elements in the second race channel is uniform. A pair of ports formed in one of the rings, each port intercepting at least one of the race channels, wherein each port has a cross-sectional area sufficient to permit the re-orientation or replacement of the axis of rotation of the rolling elements without having to remove the bearing from its installation. The rolling elements preferably are constructed such that their diameter is greater than their length. By re-orienting or replacing the rolling elements by means of the ports, the life of bearings constructed in accordance with the invention is extended without the need to disassemble either the bearing or the machine in which the bearing is installed.

13 Claims, 2 Drawing Sheets

IN SITU REPLACEABLE BEARING

FIELD OF THE INVENTION

The present invention relates to the field of antifriction bearings and, more particularly, to those anti-friction bearings where either the inner or outer diameter of the bearing remains exposed after the bearing is installed.

BACKGROUND OF THE INVENTION

As is well known, worn or defective bearings are replaced in order to maximize machinery performance and to prevent damage to both the machine in which the bearing is installed as well as to the system in which the machine is a component. The replacement operation for most bearings is a straight forward procedure. Even if the bearing being replaced is used in an assembly line operation, replacement will generally occur during times when the assembly line is inoperative, i.e. during scheduled maintenance periods. Unfortunately, bearings do not always last for their predicted life and may require immediate replacement.

It is also known that as bearing size increases, generally the complexity of replacement and the time necessary for replacement also increases. For large dimensioned bearings significant periods of time are necessary for replacement. As can be appreciated, a large dimensioned bearing failure requiring immediate replacement is highly production sensitive, i.e. extreme economic loss results from the bearing failure. In such situations economic loss not only includes the cost associated with bearing replacement, i.e. the purchase price of the replacement bearing, but also, takes into account the cost associated with disassembly and reassembly of the machine in which the bearing is installed as well as lost production costs while the machine is out of use. Large dimensioned bearings are typically installed in relatively large machines. It will be appreciated that such large machinery is very difficult and costly to disassemble in order to remove a failed bearing.

Slewing ring bearings are one example of a production sensitive bearing. These bearings are generally large dimensioned bearings specifically designed to accommodate oscillating rotational movements under heavy axial or thrust loading. Such bearings are typically found in heavy equipment such as hydraulic excavators utilized in strip mining. Such bearings typically include an inner ring and an outer ring having rolling elements positioned there between and adapted so that the rolling elements move along raceways formed in the rings. Typically a gear arrangement is formed on the exterior surface of either the inner or outer rings.

As will be appreciated, the cost of such slewing ring bearings is significant, generally in a range from tens to hundreds of thousands of dollars depending on bearing size. Accordingly, it is typically not the case for owners of heavy equipment to maintain an inventory of such bearings. It is more likely the situation that such bearings will be ordered after the event of bearing failure. In the event of a slewing ring bearing failure, several months or even more than a year may be required in order to replace the bearing.

In other large diameter bearing applications, for example drilling equipment used for tunnel excavation, bearing replacement is also production sensitive. In certain instances, it is required to excavate an auxiliary tunnel shaft adjacent to the tunnel shaft in which the drilling equipment is located in order to re-orient the drilling equipment for removal of the failed bearing and installation of the new bearing. As will be appreciated, such repair operations are both labor intensive and highly expensive, exclusive of other expenses flowing from the cessation of work during repair operations.

In order to detect impending bearing failure easier and earlier, U.S. Pat. No. 4,906,113 - Sague, incorporated herein by reference, discloses the provision of an inspection port. Utilization of such a structure enables in situ inspection of rolling elements and raceways to detect raceway and rolling element flaws as well as other conditions which would lead to bearing failure. Such inspections provide more predictable indications of bearing life versus relying solely on unreliable analytical predictions. Unfortunately, once the bearings disclosed in U.S. Pat. No. 4,906,113 actually failed, the same replacement procedure was necessary in order to render the equipment once again operable.

The novel solution presented by the invention, involves the use of an inspection port such as that disclosed in U.S. Pat. No. 4,906,113 and the provision of dual sets of raceways in each bearing raceway cavity. In the present state of the art, during operation only one pair of raceways is formed in each cavity to withstand load while providing rotational movement. A bearing incorporating the invention, upon failure or the detection of impending bearing failure, can be replaced in situ by utilizing the inspection port to re-orient the rolling elements within the raceway cavities such that the previously unused pairs of raceways are now utilized.

The use of a removable plug in a roller bearing and the provision of dual sets of raceways are individually not new. U.S. Pat. No. 4,606,654 - Yatsu et al., discloses a cross-roller bearing which incorporates a plug in the outer ring for assembly purposes. The plug is held in place by a pin. Once installed in the machine the pin is not removable. As indicated previously, U.S. Pat. No. 4,906,113 discloses an inspection port.

The provision of dual sets of raceways in the raceway cavity of a roller bearing had previously been utilized in relation to so-called "X" roller bearings. U.S. Pat. No. 2,430,359 Messinger, discloses one of the earliest of such bearings. In such bearings, certain of the rolling elements have their axes inclined in one direction with respect to the axis of rotation of the bearing while the remaining rolling elements have their axes inclined in the opposite direction. All raceways were used concurrently. Consequently, when one raceway became defective, the whole bearing was defective.

This same "X" arrangement was proposed in subsequent U.S. Pat. Nos. 2,430,359 - Messinger and 3,361,501 - Messinger et al. It will be noted that the later of these two patents also discloses the use of an opening and a plug in the outer ring. The X-type bearings disclosed in these patents show a single row of rolling elements and again all raceways were used concurrently. Consequently, one defective raceway resulted in the entire bearing defective. An additional problem with such bearings is that it was generally impossible to remove the plug without first removing the bearing from its installation. Moreover, removal of the plug generally also resulted in a loss of warranty for the bearing.

U.S. Pat. No. 3,814,488 - Rood, discloses two rows of rolling elements where the rolling elements are oriented in a "X" orientation in each row. In addition to the problem of having a defective bearing if only one of the raceways became defective, this bearing exhibited unpredictable load distribution. A designer using such a bearing could not be certain as to how much thrust load was present on each row.

Consequently, a need still exists for a bearing which has maximum life, for which in situ repair or replacement is possible and which is not production sensitive.

SUMMARY OF THE INVENTION

The advantages of the invention are achieved in a new and novel bearing and a method for extending the life of such bearings. The bearing is shown to include an inner ring having first and second race channels, wherein each race channel defines first and second raceways adapted for contact with loaded rolling elements. An outer ring is shown to have third and fourth race channels, wherein each race channel defines first and second raceways adapted for contact with loaded rolling elements. A plurality of rolling elements are positioned within the race channels and are preferably oriented so that the axis of rotation of rolling elements in the first race channel is uniform and the axis of rotation of rolling elements in the second race channel is uniform. A pair of ports are formed in one of the rings, intercepting the race channels, wherein each port has a diameter sufficient to permit the reorientation of the axis of rotation of or the replacement of the rolling elements without having to remove the bearing from its installation. The rolling elements preferably are constructed such that their diameter is greater than their length. By re-orienting or replacing the rolling elements by means of the ports, the life of a bearing constructed in accordance with the invention is extended without the need to disassemble the bearing nor the machine in which it is installed. It is also possible to replace select rollers in the bearing.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE PREFERRED EMBODIMENT

Figure 1:
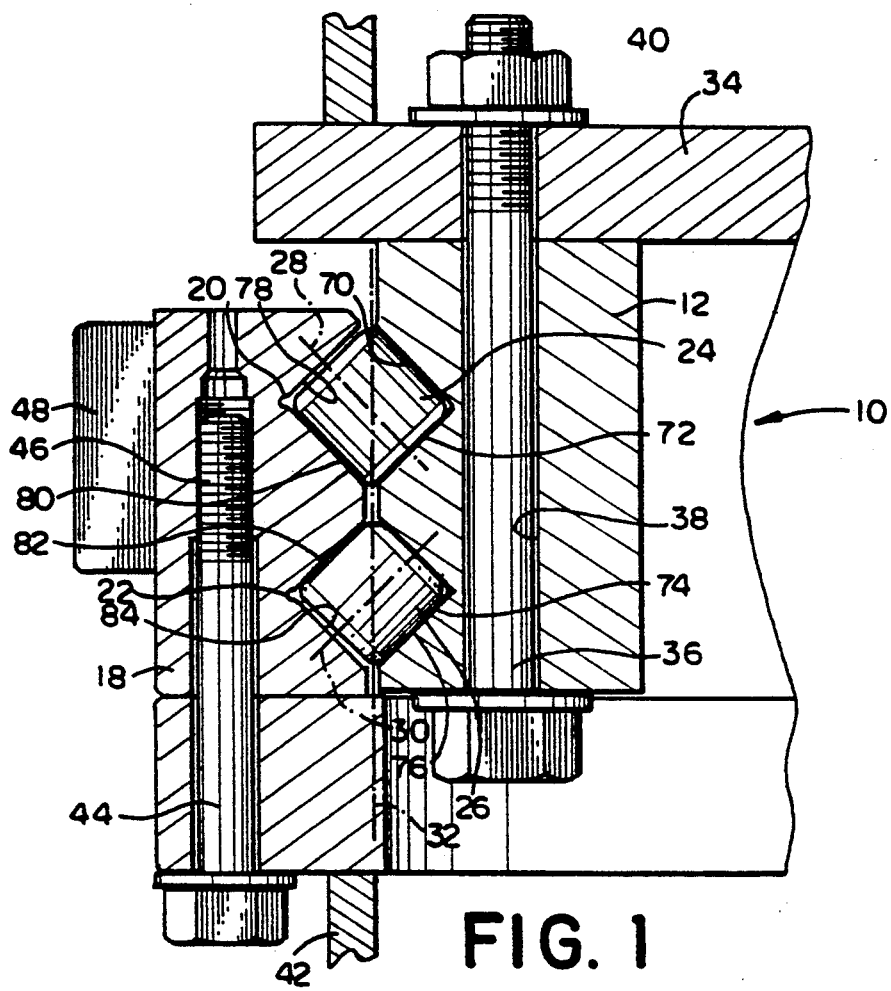
FIG. 1 is a section view of a roller bearing made in accordance with the present invention.
Figure 2:
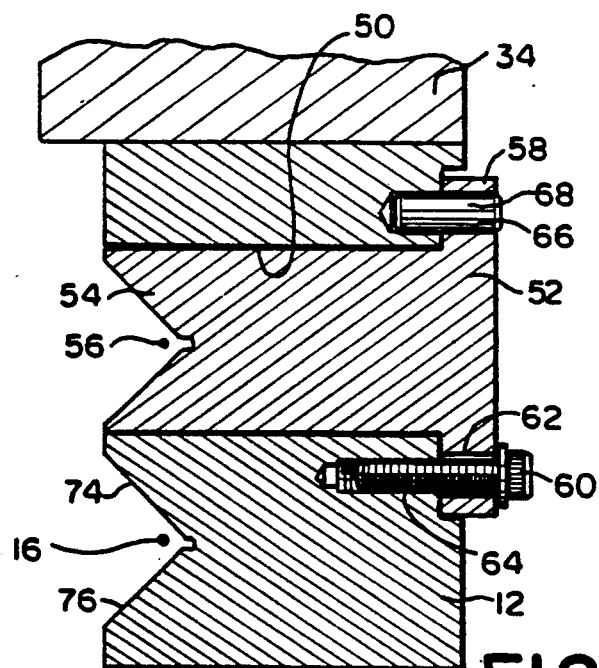
FIG. 2 is a further section view of a portion of the bearing shown in FIG. 1 wherein an inspection port is shown.

A new and novel bearing 10 according to the present invention is shown in FIGS. 1 and 2 as consisting of an inner ring 12 having upper and lower race channels 14 and 16. Outer ring 18 concentrically encloses inner ring 12 and is provided with upper and lower race channels 20 and 22, respectively. Upper race channels 14 and 20 and lower race channels 16 and 22 form in combination, upper and lower race cavities. Upper and lower rows of rolling elements 24 and 26, respectively, roll in corresponding upper and lower race cavities with the upper rolling elements 24 rotating about axes of rotation 28 and the lower rolling elements 26 about axes of rotation 30. Each of the corresponding axes, 28 and 30, being substantially orthogonal and each forming an acute angle of approximately 45° with the vertical line 32.

Inner ring 12 is fastened to an upper superstructure frame 34 by means of bolts 36 passing through regularly, circumferentially spaced bolt holes 38. The threaded ends of bolts 36 register with and engage nut 40 in superstructure frame 34. Similarly, outer ring 18 is affixed to a base frame 42 by means of bolts 44 passing through aligned regularly, circumferentially spaced bolt holes in both base frame 42 and outer ring 18. Bolts 44 engage internal threads 46 in the holes in outer ring 18. It will be noted that inner ring 12 and outer ring 18 can be connected to various frames by any suitable means without departing from or effecting the scope of the invention. A plurality of gear teeth 48 are shown to be integrally formed around the outer periphery of outer ring 18. However, it will be understood that such teeth need not be present invention. In the preferred embodiment, both inner ring 12 and outer ring 18 are made of alloy steel.

It is noted that rolling elements 24 and 26 in each row are sometimes spaced apart from each other by spacers (not shown). Such spacers are known. Although the use of spacers is preferred, the use or non-use of spacers does not effect the scope of the invention.

The length of each rolling element is shorter than the shortest diameter. Without maintaining the relationship of rolling element length to rolling element diameter, it would not be possible to reorient the rolling elements in accordance with the present invention.

A pair of ports are formed in the bearing intercepting race channels 14 and 16. In the preferred embodiment the pair of ports is formed in the inner ring. Although a pair of ports is necessary, only one port is described herein. It will be noted that the ports are formed in separate locations in the bearing, otherwise the construction of each port is identical.

Referring to FIG. 2, there is shown the structure of the inspection port for the upper row of rolling elements 24. The inspection port for the lower row of rolling elements 26 is identical and is not shown. A horizontal bore or hole 50 passes through the wall of the inner ring 12 opening to the upper race channel 14 and extending substantially across the entire width of the race channel. It is necessary that the diameter of the opening be large enough to remove and/or re-orient the rolling elements in the race channel.

A slidable plug 52 having an end 54 with a partial race channel 56 identical to race channel 14 is inserted so that the raceways formed in the inner ring match with the raceways formed in end 54 to provide a smooth continuous raceway surface. A flange 58 covering the hole 50 is bolted by bolts 60 (only one shown) passing through clearance holes 62 (only one shown) and registering with threaded holes 64 (only one shown) in inner ring 12. Flange 58 is preferably integral with plug 52. Guide hole 66 is also provided in the flange for engagement of dowel 68. In the preferred embodiment, jacking screw holes (not shown) are also provided.

As shown in FIGS. 1 and 2, each race channel 14 and 16 includes two raceways. To this end, channel 14 includes raceway 70 and 72, while race channel 16 includes raceways 74 and 76. Similarly, race channels 20 and 22 formed an outer ring 18 include raceways 78 and 80 and raceways 82 and 84, respectively. It will be appreciated that when the bearing is assembled, raceways 70 and 80 are in opposed relation for engagement of the row of rolling elements 24 and that raceways 76 and 82 are in opposed relation for engagement of the row of rolling elements 26.

Figure 3:
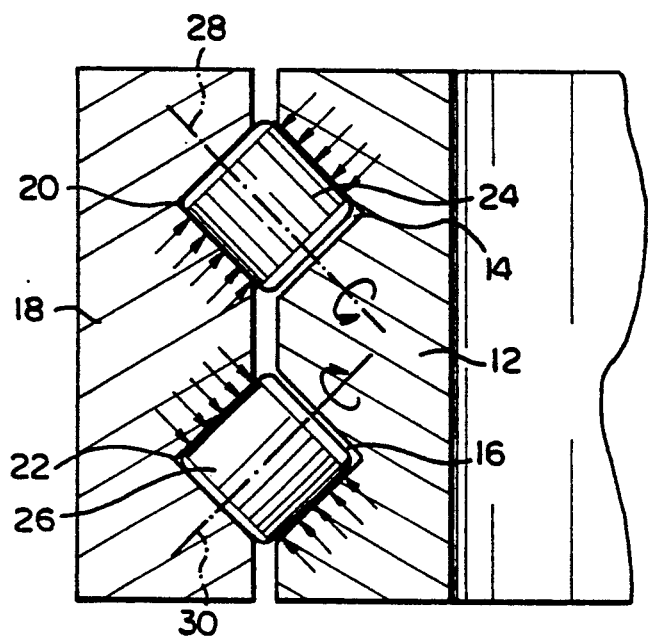
FIG. 3 is a diagrammatic view of the raceways of the bearing depicted in FIG. 1.
Figure 4:
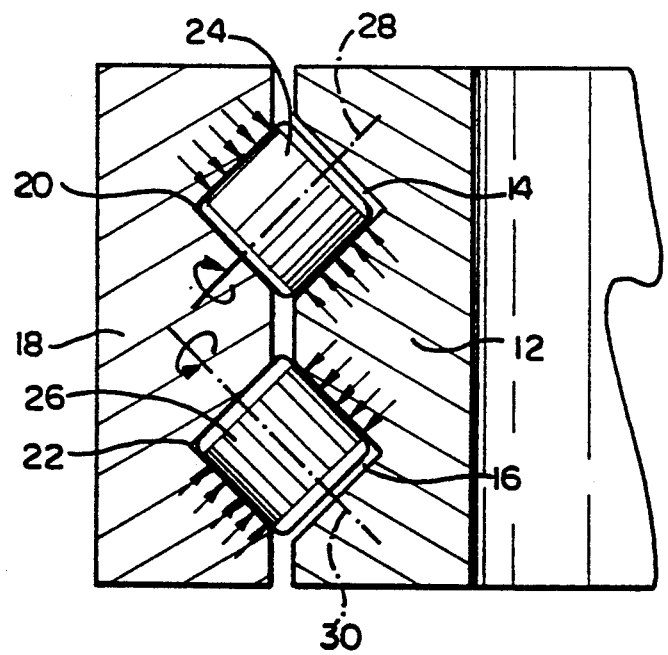
FIG. 4 is a diagrammatic view of the raceways of the bearing depicted in FIG. 1.

Each raceway is adapted for loaded rolling elements to roll along the surface thereof. In other words, the raceway surface has been dimensioned, heat treated and ground so that loaded rolling elements may move along the raceway. In this sense, it can be said that each raceway is prepared to receive loaded rolling elements. However, only two opposed raceways are utilized at any one time in each race cavity. Thus, it will be appreciated that inspection port 50 can be utilized to re-orient the rolling elements from the position shown in FIG. 3 to the orientation shown in FIG. 4. It will be noted that if spacers are utilized, the spacers too will require re-orientation in order to function properly with the re-oriented rolling elements.

It will be appreciated from the above that the cross-section of the race cavities is in the form of a square. It will also be appreciated that the raceway surfaces defined by each of the raceways in each race channel are oriented generally perpendicular to one another. In other words, raceways 70 and 72 are generally perpendicular to one another.

While the invention has been described and illustrated with reference to specific embodiments, those skilled in the art will recognize that modification and variations may be made without departing from the principles of the invention as described herein above and set forth in the following claims.

What is claimed is:

1. A bearing, comprising:
   an inner ring having first and second race channels formed therein, wherein each of said race channels defines first and second raceways and wherein the raceways are adapted for loaded rolling elements to roll along the surface thereof;
   an outer ring, concentric with said inner ring, having third and fourth race channels formed therein, wherein each of said race channels defines first and second raceways and wherein the raceways are adapted for loaded rolling elements to roll along the surface thereof;
   a plurality of rolling elements positioned within the race channels, each of said rolling elements having a central axis of rotation, wherein the axis of rotation of rolling elements in said first race channel have a first orientation and the axis of rotation of rolling elements in said second race channel have a second orientation; and
   a pair of ports formed in one of said inner and outer rings radially directed each intercepting one of said first and second race channels, wherein each port has a diameter sufficient to permit the re-orientation of the axis of rotation of said rolling elements, so that when said bearing is installed said rolling elements may be reoriented without having to remove said bearing from the installation.

2. The bearing of claim 1, further comprising a pair of plugs for insertion in the ports, each plug having an end face which forms a continuous surface upon insertion with the race channel intercepted by the port.

3. The bearing of claim 1, wherein said first orientation and said second orientation are substantially perpendicular.

4. The bearing of claim 1, wherein said first and third race channels define a first raceway cavity and said second and fourth race channels define a second raceway cavity, wherein the cross-section of said first and second raceway cavities is a square.

5. The bearing of claim 1, wherein the raceway surfaces defined by each of the raceways are oriented generally perpendicular.

6. The bearing of claim 1, wherein said rolling elements have a diameter and a length and wherein for each rolling element the diameter is greater than the length.

7. The bearing of claim 6, wherein each of said plurality of rolling elements is substantially identically dimensioned.

8. The bearing of claim 1, further comprising a second plurality of rolling elements, adapted to be installed in said bearing through said pair of ports for replacing said plurality of rolling elements.

9. A method for maximizing the operating life of a bearing, which bearing comprises an inner ring having first and second race channels formed therein, and outer ring, concentric with said inner ring, having third and fourth race channels formed therein, wherein said race channels have side walls and a plurality of rolling elements positioned in the race channels, comprising the steps of:
   adapting said race channels wherein each of said race channels defines first and second raceways and wherein the raceways are adapted for loaded rolling elements to roll along the surface thereof;
   orienting each rolling element within the race channels, wherein the axis of rotation or rolling elements in said first race channel have a first orientation and the axis of rotation of rolling elements in said second race channel have a second orientation; and
   forming a port in one of said inner and outer rings radially directed and intercepting one of said first and second race channels, wherein said port has a cross-sectional area sufficient to permit the re-orientation of the axis of rotation of said rolling elements, so that during the life of said bearing said rolling elements may be reoriented without having to remove said bearing from its installation.

10. The method of claim 9, further comprising the step of re-orienting the axis of rotation of said rolling elements.

11. The method of claim 9, wherein said step of orienting said rolling elements comprises orienting said rolling elements so that said first orientation and said second orientation are substantially perpendicular.

12. The method of claim 9, wherein the diameter of the rolling elements is greater than the length of rolling elements, further comprising the step of reorienting said rolling elements after said bearing has been operated but before the ends of said rolling elements contact said raceways.

13. A method for maximizing the operating life of a bearing, which bearing comprises an inner ring having first and second race channels formed therein, and outer ring, concentric with said inner ring, having third and fourth race channels formed therein, wherein said race channels have side walls and a plurality of rolling elements positioned in the race channels, comprising the steps of:
   adapting said race channels wherein each of said race channels defines first and second raceways and wherein the raceways are adapted for loaded rolling elements to roll along the surface thereof;

orienting each rolling element within the race channels, wherein the axis of rotation of rolling elements in said first race channel have a first orientation and the axis of rotation of rolling elements in said second race channel have a second orientation;

forming a port in one of said inner and outer rings radially directed and intercepting one of said first and second race channels, wherein said port has a cross-sectional area sufficient to permit the replacement of said rolling elements;

providing a second plurality of rolling elements adapted to be inserted through said pair of ports; and replacing said rolling elements with said second plurality of rolling elements after said bearing has been operated, whereby during the life of said bearing said rolling elements may be reoriented without having to remove said bearing from its installation.

* * * * *